United States Patent
Onodera et al.

(10) Patent No.: US 6,931,703 B2
(45) Date of Patent: Aug. 23, 2005

(54) RAIL PRODUCING METHOD AND PRODUCING EQUIPMENT

(75) Inventors: Noriaki Onodera, Kitakyushu (JP); Masafumi Shibata, Kitakyushu (JP); Masanori Miwa, Kitakyushu (JP); Kazuo Fujita, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 22 days.

(21) Appl. No.: 10/362,089

(22) PCT Filed: May 30, 2002

(86) PCT No.: PCT/JP02/05308
§ 371 (c)(1), (2), (4) Date: Feb. 19, 2003

(87) PCT Pub. No.: WO02/102537
PCT Pub. Date: Sep. 11, 2003

(65) Prior Publication Data
US 2003/0168135 A1 Sep. 11, 2003

(30) Foreign Application Priority Data
May 30, 2001 (JP) ........................................ 2001-161676

(51) Int. Cl.$^7$ ................................................. B23P 23/04
(52) U.S. Cl. ...................... 29/33 C; 29/527.6; 29/527.7; 72/203; 83/425.3; 83/425.4
(58) Field of Search ............................ 29/527.6, 527.7, 29/33 C; 72/203; 83/425, 425.2, 425.3, 425.4, 15, 112, 158, 288, 301, 404

(56) References Cited

U.S. PATENT DOCUMENTS

| | | | | |
|---|---|---|---|---|
| 3,841,180 A | * | 10/1974 | Gutibauer et al. | .............. 83/15 |
| 4,658,363 A | * | 4/1987 | Tippins et al. | .............. 700/148 |
| 4,939,967 A | * | 7/1990 | Wallis | ............................ 83/150 |
| 4,960,023 A | * | 10/1990 | Reuter et al. | .................. 83/368 |
| 5,018,666 A | | 5/1991 | Cryderman et al. | ......... 238/122 |
| 5,125,250 A | * | 6/1992 | Sun | ................................. 72/8.5 |
| 5,195,573 A | * | 3/1993 | Cryderman et al. | ......... 164/476 |

(Continued)

FOREIGN PATENT DOCUMENTS

| | | | | |
|---|---|---|---|---|
| EP | 411688 A1 | * | 2/1991 | ........... B23D/33/00 |
| FR | 2547515 A1 | * | 12/1984 | ........... B21B/39/12 |
| JP | 53034185 | | 3/1978 | |
| JP | 54138186 | | 9/1979 | |
| JP | 57138515 | | 8/1982 | |
| JP | 57198216 A | * | 12/1982 | ............ C21D/9/04 |
| JP | 633696 | | 1/1988 | |
| JP | 63288617 | | 11/1988 | |
| JP | 01299705 | | 12/1989 | |
| JP | 02179311 | | 7/1990 | |
| JP | 07108430 | | 4/1995 | |
| JP | 09248625 | | 9/1997 | |
| JP | 10314803 | | 12/1998 | |
| JP | 288851 | | 10/2000 | |

Primary Examiner—Essama Omgba
(74) Attorney, Agent, or Firm—Baker Botts LLP

(57) ABSTRACT

The present invention provides a method and equipment for producing a rail, the method and equipment being capable of lowering a bend at an end of a rail effectively and the truncation amount thereof. The present invention is a method for producing a rail, characterized by: cooling a hot-rolled mother rail to an ordinary temperature substantially while the length thereof after the hot rolling is maintained; and thereafter cutting the mother rail simultaneously in a predetermined length with at least three cold-sawing machines. Further, the present invention is equipment for producing a rail, characterized by equipped with: a transfer bed capable of moving a mother rail cooled to an ordinary temperature substantially while the length thereof after hot rolling is maintained in the rolling direction and/or in the direction perpendicular to the rolling direction; and at least three cold-sawing machines disposed in parallel with each other on said transfer bed.

5 Claims, 1 Drawing Sheet

U.S. PATENT DOCUMENTS

| | | | | |
|---|---|---|---|---|
| 5,406,870 A | * | 4/1995 | Suitts et al. | 83/23 |
| 5,419,387 A | | 5/1995 | Cryderman et al. | 164/417 |
| 5,472,041 A | * | 12/1995 | Cryderman et al. | 164/476 |
| 5,507,081 A | * | 4/1996 | Cryderman et al. | 29/33 C |
| 5,666,707 A | * | 9/1997 | Cryderman et al. | 29/33 C |
| 5,810,951 A | * | 9/1998 | Dorricott | 148/654 |
| 5,829,117 A | * | 11/1998 | Okawa et al. | 29/527.6 |
| 6,142,050 A | * | 11/2000 | Miki | 83/425.2 |
| 6,209,187 B1 | * | 4/2001 | Boeke | 29/527.7 |
| 6,309,482 B1 | * | 10/2001 | Dorricott et al. | 148/654 |
| 6,698,266 B2 | * | 3/2004 | Brower | 72/203 |

* cited by examiner

RAIL PRODUCING METHOD AND PRODUCING EQUIPMENT

CROSS-REFERENCE TO RELATED APPLICATIONS

This application is a national stage application of PCT Application No. PCT/JP02/05308 which was filed on May 30, 2002 (the "International Application"). This application claims priority from the International Application pursuant to 35 U.S.C. § 365. The present application also claims priority under 35 U.S.C. § 119 from Japanese Patent Application No. 2001-161676 which was filed on May 30,2001. The entire disclosures of these applications are incorporated herein by reference.

TECHNICAL FIELD

The present invention relates to a method and equipment for producing a rail and, in particular, to a method and equipment capable of producing a rail with great efficiency and suppressing the generation of a bend at an end of the rail.

BACKGROUND ART

A generally employed method for producing a rail includes the processes of: heating a bloom and hot-rolling it into a predetermined shape; then cutting the hot-rolled material in lengths close to the final product lengths with a hot-sawing machine; thereafter applying or omitting a heat treatment depending on the required mechanical properties; cooling the cut materials to an ordinary temperature; applying or omitting a straightening treatment depending on the requirement; and subjecting the produced materials to predetermined inspections such as a flaw detection, a shape inspection and the like.

Rails are laid generally after connecting several rails with each other by welding in order to protect the ends of the rails from wear caused by the passages of trains. In such a case, as the wear increases when the welding planes deviate from each other even slightly, it is strictly required to minimize the deviation created when the end planes of rails are connected face to face. For example, JIS E1101 prescribes that the tolerance of a bend at an end of a 50 kgN rail, an ordinary rail, must be 1.0 mm or less in the rightward, leftward and upward directions and 0.3 mm or less in the downward direction, per 1.5 m in length. Further, a rail for a high-speed railway or a heavy-load railway, the demands for which have been increasing in recent years, is required to have a yet smaller bend at an end thereof. Furthermore, though the technologies of producing an ultra-long rail 500 feet or more in length at a stroke from a continuous casting process to a final process have been disclosed recently in U.S. Pat. Nos. 5,018,666 and 5,419,387, those technologies are seldom put to practical use in actual production.

However, when a rail is produced through a continuous process, an en of the rail is a portion to which rolling or straightening can hardly be applied. In a rolling process, it is difficult to achieve a required dimensional accuracy at a portion within the range from he tip or tail end of a rail to a position a certain length distant from either of them. In addition, when a straightening treatment is required and thus a straightener wherein a plurality of rolls are arranged in a zigzag pattern is used, the range from an end to a posit n about 1 to 2 m distant from the end, namely the range in the length corresponding to twice the interval between two adjacent rolls, is not leveled, namely becomes a dead zone, and therefore he effect of the straightening cannot be expected.

A practice commonly employed in order to satisfy the aforementioned criterion of a bend at an end of a rail in such a situation is to cut off a portion with a considerable length at an end of the rail and, when the criterion is not still satisfied even by doing so, to straighten the rail with a press. However, the longer the cut-off length, the higher the cost and the lower the yield. Further, as the cut-off process of a rail or the pressing process thereof requires time for the operation, each of the processes causes a bottleneck when it is incorporated into a continuous process. On the other hand, when each of the processes is employed as an off-line process, the productivity deteriorates. In particular, when a cold-sawing machine is employed and a cut-off is carried out at a high speed, a large amount of heat is generated, the heat affects only the cut-off end and, thus, the hardness or the like of the end changes largely, and it is therefore necessary either to regulate the cutting speed or to use a special device which does not generate a great amount of heat.

Furthermore, the problem here is that straightening by a press can hardly satisfy a precise dimensional accuracy and thus cannot cope with any future stringent criterion.

DISCLOSURE OF THE INVENTION

The present invention is accomplished to solve the problems of the above-mentioned prior arts, and provides a method and equipment for producing a rail, the method and equipment being capable of incorporating a series of processes up to the final process of a product into a single continuous line and improving the productivity and yield.

The gist of the present invention, which solves the above problems, is as follows.

(1) A method for producing a rail, characterized by: cooling a hot-rolled mother rail to an ordinary temperature substantially while the length thereof after the hot rolling is maintained; and thereafter cutting the mother rail simultaneously in a predetermined length with at least three cold-sawing machines.

(2) A method for producing a rail according to item (1), characterized by subjecting a hot-rolled mother rail to a heat treatment wherein at least the head of the mother rail is acceleratedly cooled, from a temperature in the austenite range or higher, at a cooling rate of 1 to 10° C./sec.

(3) A method for producing a rail according to item (1) or (2), characterized in that the length of the mother rail after hot rolling is in the range from 100 to 200 m.

(4) A method for producing a rail according to any one of items (1) to (3), characterized by applying or omitting a straightening treatment and successively applying inspection to a mother rail prior to the cut-off with cold-sawing machines.

(5) A method for producing a rail according to item (4), characterized by cutting a mother rail with cold-sawing machines at the portions where a straightening treatment is applied.

(6) A method for producing a rail according to any one of items (1) to (5), characterized by: cutting some portions of a mother rail with a length after hot rolling in the lengths of final products with at least three cold-sawing machines; and then cutting the remaining portions in the lengths of final products with at least two cold-sawing machines disposed at the rear side.

(7) Equipment for producing a rail, characterized by being equipped with: a transfer bed capable of moving a mother rail cooled to an ordinary temperature substantially while the length thereof after hot rolling is maintained in the rolling direction and/or in the direction perpendicular to the rolling direction; and at least three cold-sawing machines disposed in parallel with each other on said transfer bed.

(8) Equipment for producing a rail according to item (7), characterized in that at least one unit of said cold-sawing machines is fixed and the other units are placed so as to be movable along said transfer bed.

(9) Equipment for producing a rail according to item (7) or (8), characterized by consecutively disposing a cooling bed on which a mother rail is cooled to an ordinary temperature after hot rolling or heat treatment, straightner, inspection apparatuses, said transfer bed, and said cold-sawing machines.

(10) Equipment for producing a rail according to any one of items (7) to (9), characterized by disposing additionally two or more units of cold-sawing machines in parallel with each other at the rear side of said cold-sawing machines on said transfer bed.

(11) Equipment for producing a rail according to any one of the items (7) to (10), characterized in that the number of cold-sawing machines is not less than the number obtained by adding one to the number of the final products that are cut out from a mother rail after hot rolling.

(12) Equipment for producing a rail according to any one of the items (7) to (11), characterized by disposing additionally at least one punching machine in the vicinity of at least one cold-sawing machine.

BEST MODE FOR CARRYING OUT THE INVENTION

Figure 1:
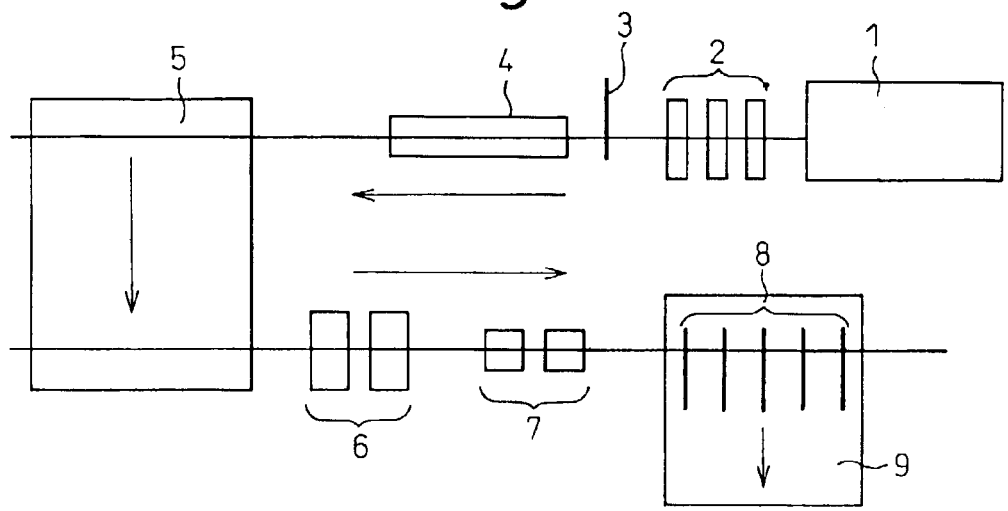
FIG. 1 is an illustration showing an embodiment of equipment for producing a rail according to the present invention.

The present invention is hereunder explained in detail based on the embodiments shown in the drawings.

FIG. 1 shows an example of a layout of equipment for producing a rail according to the present invention. A bloom containing predetermined components is heated to about 1,300° C. in a reheating furnace 1 and thereafter formed into a mother rail having the sectional shape thereof by passing through a plurality of reversing hot-rolling mills or a tandem hot-rolling mill 2. In the present invention, the formed mother rail is successively cooled to an ordinary temperature on a cooling bed 5 while the length thereof after the hot rolling is maintained.

Further, in advance of directly cooling a mother rail to an ordinary temperature on the cooling bed 5, when a heat treatment is required in order to improve the wear resistance or toughness of at least the railhead, the heat treatment is applied beforehand to the mother rail using a heat treatment apparatus 4 disposed at the downstream side of the rolling mill assembly 2. In the heat treatment, a mother rail is cooled after hot rolling from a temperature in the austenite range or higher at a cooling rate of 1 to 10° C./sec. by a known method. When a cooling commencement temperature is low, a mother rail may be heated in advance of the cooling. As the cooling method, a method of blowing a gas such as air or a mist is preferable from the viewpoint of keeping the cooling rate proper.

Here, a non-rolled portion or a large bend is apt to be created, at one or both ends of a mother rail, immediately after hot rolling and may be an obstacle to the subsequent transfer or straightening operation. In such a case, a portion with a certain length at an end of the mother rail immediately after hot rolling may be cut off using a hot-sawing machine 3 disposed between the rolling mill assembly 2 and the heat treatment apparatus 4. The length of a mother rail after hot rolling is determined based on production capacity and the equipment specification. However, for the purpose of suppressing the quality difference resulting from the temperature difference between the tip and the tail end of a mother rail, it is preferable to regulate the length of the mother rail in the range from 100 to 200 m and to add a certain length of cutting allowance thereto.

The cooling bed 5 has a space wherein a long rail may be placed as it is. A mother rail after hot rolling and being cooled to an ordinary temperature on the cooling bed is: straightened with a straightner assembly 6 composed of two units, one in the vertical direction and the other in the horizontal direction, if it is required to do so depending on the extent of a bend or a residual stress; thereafter inspected for quality such as flaws and dimensions with inspection apparatuses 7; and finally cut in the predetermined length for delivery (of final products) with cold-sawing machines 8 on a transfer bed 9. Those facilities, namely the cooling bed, the straightner assembly, the inspection apparatuses, the transfer bed and the cold-sawing machines, are arranged in sequence and constitute a single line. Note that, if a bend or the like of a mother rail cooled to an ordinary temperature is within a tolerance, the rail is not necessarily straightened. The most important features of the present invention are: to cut a mother rail at plural portions simultaneously at one time by disposing a plurality of cold-sawing machines in parallel with each other on a transfer bed when the mother rail is cut; and moreover, if a mother rail has been subjected to a straightner assembly, to cut the mother rail with the cold-sawing machines at the portions that have been straightened. Since a non-straightened portion at an end of a cut-out product rail is completely removed by cutting the mother rail at the portions that have been straightened, a product rail that hardly has any bend at an end can be obtained, as in the case of cutting a mother rail at a center portion.

The cold-sawing machines 8 are configured so that at least three units thereof may be in cutting operation simultaneously. It is desirable to install the cold-sawing machines of the number not less than the number obtained by adding one to the number of the final products that are cut out from a mother rail with a length after hot rolling, that is, the cold-sawing machines of the number that allows a mother rail to be cut off at both ends and the intermediate portions at one time. For example, when eight product rails 25 m in length each, which are generally used, are cut out from a mother rail with a length after hot rolling of 200 m, it is desirable to install nine cold-sawing machines.

The cold-sawing machines 8 are installed in parallel on the transfer bed 9 so that each interval between adjacent two machines may be the same as the length of each product rail. When the lengths of product rails are always constant, all cold-sawing machines may be fixed and mother rails may be cut off while the mother rails are fed in regular succession. On the other hand, when the ordered lengths of product rails are not always constant, it is preferable to fix one unit which acts as the pivot or more, for example, a unit at an end or units at both ends, of the cold-sawing machines and to install the other units so as to be movable freely in the longitudinal direction of the mother rail in accordance with desired lengths.

Further, there is a case where a hole is pierced in the web at an end portion of a product rail for the purpose of connection. In this case, the operation efficiency can be improved further by incorporating a punching machine into a cold-sawing machine and piercing a hole simultaneously with cutting.

A product rail cut into a product length is moved further toward the rolling direction or the direction perpendicular to the rolling direction by the transfer bed 9, is piled in a product stockyard or is loaded directly on a transportation means according to circumstances, and then is delivered.

Figure 2:
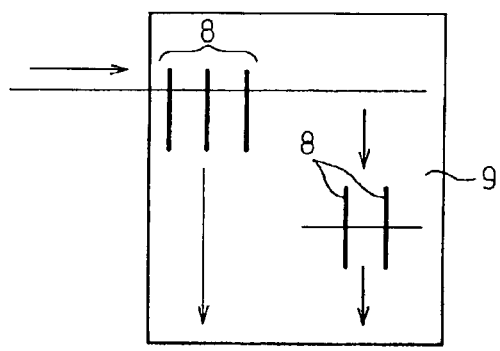
FIG. 2 is an illustration showing another embodiment of cold-sawing machines according to the present invention.
Figure 3:
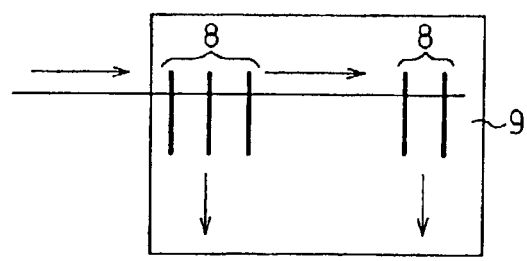
FIG. 3 is an illustration showing yet another embodiment of cold-sawing machines according to the present invention.

Here, though FIG. 1 shows an example of a configuration wherein all cold-sawing machines are arranged in a row, as shown in FIG. 2 or 3, a configuration may be adopted, wherein the cold-sawing machines are installed in the form of two stages so that some portions of a mother rail with a length after hot rolling are cut in the lengths of final products at the front stage and the remaining portions are cut in the lengths of final products with at least two cold-sawing machines disposed at the rear stage. This kind of a configuration makes it possible to shorten and optimize the cutting operation, for example, in such a case as to cut out a mother rail in a length shorter than usual. In addition, the configuration is effective as an equipment layout when a space is not sufficiently secured for a one-stage configuration.

By using above-mentioned equipment for producing a rail, it becomes possible to make a bend at a rail end very small even with the total length of truncated portions not increased. That is, even though, by a conventional method of employing a hot-sawing machine, bends have been created at the successive heat treatment and cooling and some of the bends have remained at the ends, by the method of the present invention, the straightness of a mother rail is secured comparatively easily at the center portion thereof through the rolling and subsequent straightening and therefore it becomes possible to make a bend at an end very small by cutting the mother rail at the center portion after cooling. Furthermore, an additional truncation of the cut portion is not required and a straightening by a press or the like is also not required.

Here, though each of the product rails obtained from both the ends of a mother rail with a length after hot rolling still has a large bend at one end of the product rail, the bend can be prevented from remaining by removing only the end portion sufficiently. Even though such truncation is applied, the truncation is limited to the two portions at both the ends of the mother rail with a length after hot rolling and therefore the number of the truncated portions is one of the several parts of those in the case of a prior art. For that reason, even when the truncated length is sufficiently long, the influence of the yield drop on the cost is suppressed to a low level.

EXAMPLE

As an example of the present invention, six product rails 25 m in length each were produced through the processes of: subjecting a mother rail 153 m in length produced beforehand by heating, rolling and then removing non-rolled portions to an accelerated-cooling from a temperature in the austenite range or higher to about 500° C. at a cooling rate of 2° C./sec.; successively naturally cooling the mother rail to an ordinary temperature; thereafter subjecting it to straightner and inspection apparatuses; and finally cutting and removing both the end portions in the length of 1.5 m each and, at the same time, cutting the other portion in the length of the products using seven units of cold-sawing machines.

In addition, as a comparative example, six product rails 25 m in length each were produced through the processes of: cutting a mother rail 153 m in length produced beforehand by heating, rolling and then removing non-rolled portions into six pieces of rails 25.5 m in length each using a hot-sawing machine; successively subjecting them to an accelerated-cooling from a temperature in the austenite range or higher to about 500° C. at a cooling rate of 2° C./sec. as in the case of the example of the present invention; successively naturally cooling the rails to an ordinary temperature; thereafter subjecting them to straightners and inspection apparatuses; and finally cutting and removing both the end portions of each of the rails in the length of 0.25 m each.

30 pieces of the product rails were produced as the example of the present invention and the same pieces of product rails as the comparative example by the aforementioned methods, and the bends at the ends of each product rail in the vertical direction and the horizontal direction were measured. The averages of the absolute values of the bends are shown in Table 1. Here, in the examples, as the invented example and the comparative-example were identical in the total cut-off length, whereas the bends were not sufficiently removed in case of the comparative example, the bends could be suppressed to about one fifth of those of the comparative example in case of the invented example. Here, it is a matter of course that, in order to decrease the amount of a bend in case of the comparative example to the same extent as the case of the invented example, it is necessary to increase the amount of the truncation.

TABLE 1

|  | Bend in perpendicular direction | Bend in horizontal direction |
| --- | --- | --- |
| Invented example | 0.2 mm | 0.2 mm |
| Comparative example | 1.0 mm | 0.9 mm |

INDUSTRIAL APPLICABILITY

As it has been explained above, by employing a method and equipment for producing a rail according to the present invention, it becomes possible to greatly decrease a bend at an end of the rail and to eliminate an off-line leveling work. Further, it becomes possible to decrease the truncation amount and thus to reduce the cost significantly.

All cited references and specification are hereby incorporated herein by reference in their entireties.

What is claimed is:

1. An equipment for producing at least one particular rail, comprising:

a reheating furnace, a hot-rolling mill, a hot sawing machine, a heat-treatment apparatus, a cooling bed, a straightener assembly, an inspection apparatus, an a transfer bed wherein;

the transfer bed is configured to move a mother rail that is cooled to a particular temperature while maintaining a length of the cooled mother rail in at least on rolling direction of the mother rail and at least one direction that is perpendicular to the rolling direction, wherein at least three cold-sawing machines are disposed parallel to each other at a rear side of at least one other cold-sawing machines on the transfer bed, for cutting a first portion of the mother rail to a first length, wherein at least one unit of the cold-sawing machines is fixed a other units of the cold-sawing machines are placed to be movable along the transfer bed for cutting a second portion of the mother rail to a second length.

2. The equipment according to claim 1, wherein:

the mother rail is cooled on the cooling bed;

the straightener is disposed immediately after the cooling bed;

the inspection apparatus is disposed immediately after the straightener, the transfer bed is disposed immediately after the inspection apparatus; and at least one cold-sawing machine disposed immediately after the transfer bed.

3. The equipment according to claim 1, wherein a umber of the cold-sawing machines is at least a number obtained by adding one to a number of the at least one particular rail cut from the mother rail after hot rolling.

4. The equipment according to claim 1, further comprising at least one punching machine provided in a vicinity of at least one of the cold-sawing machines.

5. The equipment according to claim 1, wherein the particular temperature is a temperature of the mother rail to which the mother rail is cooled after being hot-rolled.

* * * * *